United States Patent
Kim et al.

(10) Patent No.: US 11,721,481 B2
(45) Date of Patent: Aug. 8, 2023

(54) ELECTRONIC COMPONENT

(71) Applicant: SAMSUNG ELECTRO-MECHANICS CO., LTD.

(72) Inventors: Sang Yeop Kim, Suwon-si (KR); Beom Joon Cho, Suwon-si (KR); Gyeong Ju Song, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/343,321

(22) Filed: Jun. 9, 2021

(65) Prior Publication Data

US 2022/0122772 A1 Apr. 21, 2022

(30) Foreign Application Priority Data

Oct. 20, 2020 (KR) .......................... 10-2020-0135963

(51) Int. Cl.
| | |
|---|---|
| H01G 4/012 | (2006.01) |
| H01G 4/30 | (2006.01) |
| H01G 2/06 | (2006.01) |
| H01G 4/232 | (2006.01) |
| H01G 4/008 | (2006.01) |
| H01G 4/12 | (2006.01) |

(52) U.S. Cl.
CPC .............. *H01G 4/012* (2013.01); *H01G 2/065* (2013.01); *H01G 4/008* (2013.01); *H01G 4/1209* (2013.01); *H01G 4/232* (2013.01); *H01G 4/30* (2013.01)

(58) Field of Classification Search
CPC .......... H01G 2/06; H01G 2/065; H01G 4/008; H01G 4/012; H01G 4/1209; H01G 4/232; H01G 4/30
See application file for complete search history.

(56) References Cited

U.S. PATENT DOCUMENTS

| 2015/0114697 A1* | 4/2015 | Murrell ............. H01L 23/49565 174/255 |
| 2015/0187495 A1 | 7/2015 | Maeda et al. |

(Continued)

FOREIGN PATENT DOCUMENTS

| JP | H04188810 A | * 7/1992 |
| JP | 2014-220470 A | 11/2014 |
| JP | 2015-128084 A | 7/2015 |

*Primary Examiner* — Nathan Milakovich
(74) *Attorney, Agent, or Firm* — Morgan, Lewis & Bockius LLP (57) ABSTRACT

An electronic component includes: a body; first and second external electrodes including first and second head portions disposed on opposite end surfaces of the body; and first and second metal frames, the first metal frame including a first support portion bonded to the first head portion, and a first mounted portion extending from the first support portion, and the second metal frame including a second support portion bonded to the second head portion, and a second mounted portion extending from the second support portion. $0.2A \le B \le 0.8A$, in which an area of each of the first and second head portions is A, and an area of each of a region in which the first head portion and the first support portion are bonded to each other, and a region in which the second head portion and the second support portion are bonded to each other is B.

18 Claims, 9 Drawing Sheets

(56) References Cited

U.S. PATENT DOCUMENTS

2018/0197681 A1\* 7/2018 Ando ............... H01G 4/232
2018/0374648 A1\* 12/2018 Na .................. H01G 4/248
2022/0076884 A1\* 3/2022 Sim ................. H01G 4/232

\* cited by examiner

ELECTRONIC COMPONENT

CROSS-REFERENCE TO RELATED APPLICATION(S)

This application claims benefit of priority to Korean Patent Application No. 10-2020-0135963 filed on Oct. 20, 2020 in the Korean Intellectual Property Office, the disclosure of which is incorporated herein by reference in its entirety.

TECHNICAL FIELD

The present disclosure relates to an electronic component.

BACKGROUND

A multilayer capacitor has been used in various electronic devices since it is relatively small and implements a high capacitance.

Recently, due to the rapid rise in popularity of eco-friendly vehicles and electric vehicles, power driving systems in vehicles have increased, so that a demand for the multilayer capacitor required in a vehicle has increased.

In order to be used as a component for a vehicle, a multilayer capacitor should have a high level of thermal reliability, electrical reliability, and mechanical reliability, and a required level of performance of the multilayer capacitor has gradually been increased. Therefore, the multilayer capacitor is required to have a structure that is highly resistant to vibration or deformation.

To improve such resistance against vibration or deformation, an electronic component having a structure, in which the multilayer capacitor is mounted so as to be spaced apart from a board by a predetermined distance by using a metal frame, has been proposed.

However, in the electronic component using the metal frame according to the related art, generally, there is a difference in coefficients of thermal expansion between bonding surfaces due to a difference in component between an external electrode of the capacitor, and the metal frame.

In addition, when each of the external electrode and the metal frame repeatedly contracts and expands according to a temperature change applied to the electronic component, a bonding strength at a bonding interface is weakened, and as a result, product defects such as delamination and cracks occur.

SUMMARY

An aspect of the present disclosure may provide an electronic component that prevents a bonding strength at a bonding interface between an external electrode of a multilayer capacitor and a metal frame from being weakened, thereby having improved durability.

According to an aspect of the present disclosure, an electronic component may include: a body; first and second external electrodes including first and second head portions disposed on opposite end surfaces of the body in a first direction, respectively; and first and second metal frames, the first metal frame including a first support portion bonded to the first head portion, and a first mounted portion extending from a lower end of the first support portion in the first direction, and the second metal frame including a second support portion bonded to the second head portion, and a second mounted portion extending from a lower end of the second support portion in the first direction. $0.2A \leq B \leq 0.8A$, in which an area of each of the first and second head portions is A, and an area of each of a region in which the first head portion and the first support portion are bonded to each other, and a region in which the second head portion and the second support portion are bonded to each other is B.

According to an aspect of the present disclosure, an electronic component may include: a body; first and second external electrodes including first and second head portions disposed on opposite end surfaces of the body in a first direction, respectively; and first and second metal frames, the first metal frame including a first support portion bonded to the first head portion, and a first mounted portion bent from the first support portion, and the second metal frame including a second support portion bonded to the second head portion, and a second mounted portion bent from the second support portion. $0.2A \leq B \leq 0.8A$, in which A is an area of the first head portion and B is an area of a region in which the first head portion and the first support portion are bonded to each other.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of each of a multilayer ceramic capacitor and an electronic component, respectively.

In the present specification, the length direction may refer to an X direction or a first direction, the width direction may refer to a Y direction or a second direction, and the thickness direction may refer to a Z direction, a third direction, or a stacking direction.

Figure 1:
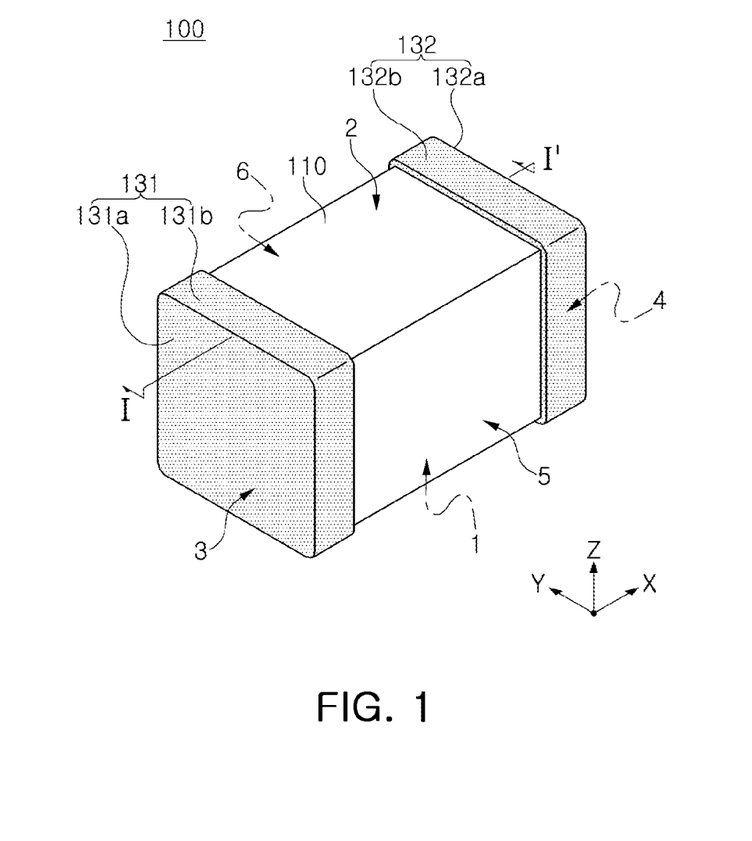
FIG. 1 is a perspective view schematically illustrating a multilayer capacitor according to an exemplary embodiment in the present disclosure.
Figure 2A:
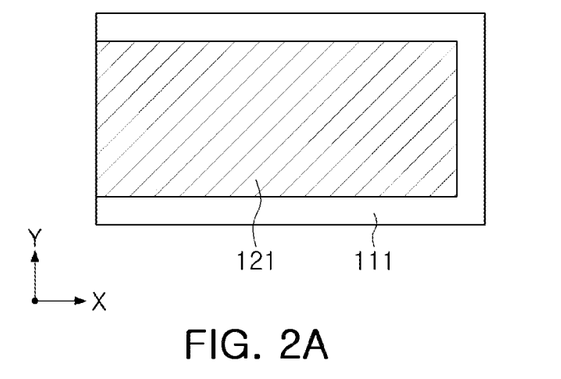
FIGS. 2A and 2B are plan views illustrating first and second internal electrodes included in the multilayer capacitor of FIG. 1, respectively.
Figure 2B:
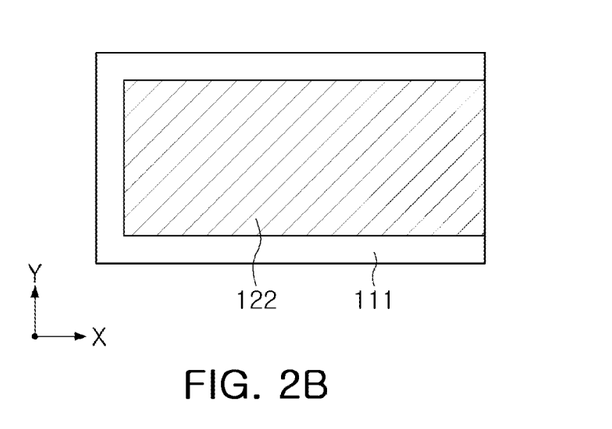
Figure 3:
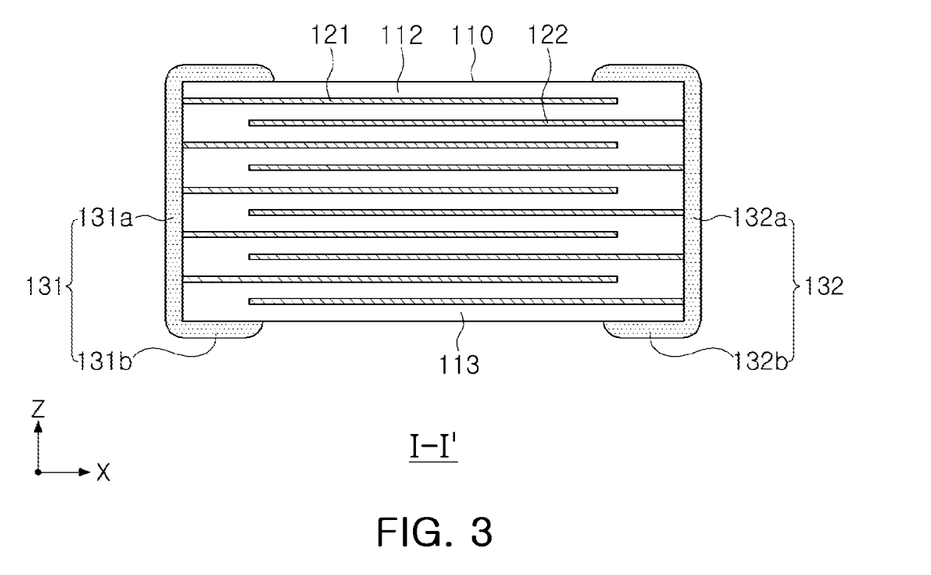
FIG. 3 is a cross-sectional view taken along line I-I' of FIG. 1.

FIG. 1 is a perspective view schematically illustrating a multilayer capacitor according to an exemplary embodiment in the present disclosure, FIGS. 2A and 2B are plan views illustrating first and second internal electrodes included in the multilayer capacitor of FIG. 1, respectively, and FIG. 3 is a cross-sectional view taken along line I-I' of FIG. 1.

First, a multilayer capacitor 100 applied to an electronic component according to an exemplary embodiment in the present disclosure will be described with reference to FIGS. 1 through 3.

Referring to FIGS. 1 through 3, the multilayer capacitor 100 according to an exemplary embodiment in the present disclosure includes a body 110 and first and second external electrodes 131 and 132 disposed on opposite end surfaces of the body 110 in the first direction, respectively. Here, the end surfaces on which the first and second external electrodes 131 and 132 are disposed, respectively, refer to surfaces positioned at end portions of the body 110 in the first direction.

The body 110 may be formed by stacking and then sintering a plurality of dielectric layers 111 in the Z direction, and adjacent dielectric layers 111 of the body 110 may be integrated with each other so that boundaries therebetween are not readily apparent without using a scanning electron microscope (SEM).

In addition, the body 110 may include the plurality of dielectric layers 111 and first and second internal electrodes 121 and 122 alternately disposed in the Z direction with each of the dielectric layers 111 interposed therebetween and having different polarities.

Further, the body 110 may include an active region, which contributes to forming a capacitance of the capacitor, and cover regions 112 and 113 formed as margin portions on upper and lower portions of the active region in the Z direction, respectively.

A shape of the body 110 is not particularly limited, but may be a hexahedral shape, and the body 110 may have first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2, connected to the third and fourth surfaces 3 and 4, and opposing each other in the Y direction.

The dielectric layer 111 may include a ceramic powder such as a $BiTiO_3$-based ceramic powder.

An example of the $BiTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, is partially solid-dissolved in $BaTiO_3$. However, the $BiTiO_3$-based ceramic powder is not limited thereto.

In addition, the dielectric layer 111 may further include a ceramic additive, an organic solvent, a plasticizer, a binder, a dispersant, and the like, in addition to the ceramic powder.

The ceramic additive may include, for example, a transition metal oxide or a transition metal carbide, a rare earth element, magnesium (Mg), aluminum (Al), or the like.

The first and second internal electrodes 121 and 122, which are electrodes having different polarities, may be formed on the dielectric layers 111 and be stacked in the Z direction, and may be alternately disposed in the body 110 to face each other in the Z direction with each of the dielectric layers 111 interposed therebetween.

In this case, the first and second internal electrodes 121 and 122 may be electrically insulated from each other by each of the dielectric layers 111 disposed therebetween.

Meanwhile, a structure in which the internal electrodes are stacked in the Z direction is illustrated and described in the present disclosure. However, the present disclosure is not limited thereto, and may also be applied to a structure in which the internal electrodes are stacked in the Y direction, if necessary.

One ends of the first and second internal electrodes 121 and 122 may be exposed through the third and fourth surfaces 3 and 4 of the body 110, respectively.

The ends of the first and second internal electrodes 121 and 122 alternately exposed through the third and fourth surfaces 3 and 4 of the body 110, respectively, may be electrically connected to the first and second external electrodes 131 and 132 (which will be described later) disposed at opposite end surfaces of the body 110 in the X direction, respectively.

With the configuration as described above, when predetermined voltages are applied to the first and second external electrodes 131 and 132, electric charges may be accumulated between the first and second internal electrodes 121 and 122.

In this case, a capacitance of the multilayer capacitor 100 may be in proportion to an area of a region in which the first and second internal electrodes 121 and 122 overlap each other in the Z direction in the active region.

Further, a material of each of the first and second internal electrodes 121 and 122 is not particularly limited, but may be a noble metal material or a conductive paste including one or more of nickel (Ni) and copper (Cu).

In this case, a method of printing the conductive paste may be a screen-printing method, a gravure printing method, or the like, but is not limited thereto.

Voltages having different polarities may be provided to the first and second external electrodes 131 and 132, respectively, and the first and second external electrodes 131 and 132 may be disposed on the opposite end surfaces of the body 110 in the first direction (X direction), respectively, and may be electrically connected to the exposed ends of the first and second internal electrodes 121 and 122, respectively.

The first external electrode 131 may include a first head portion 131a and a first band portion 131b.

The first head portion 131a may be disposed on the third surface 3 of the body 110, and may be in contact with the ends of the first internal electrodes 121 externally exposed through the third surface 3 of the body 110. Further, the first head portion 131a serves to physically and electrically connect the first internal electrodes 121 and the first external electrode 131 to each other.

The first band portion 131b extends from the first head portion 131a to portions of the first, second, fifth, and sixth surfaces 1, 2, 5, and 6 of the body 110 in order to improve a bonding strength, or the like.

The second external electrode 132 may include a second head portion 132a and a second band portion 132b.

The second head portion 132a may be disposed on the fourth surface 4 of the body 110, and may be in contact with the ends of the second internal electrodes 122 externally exposed through the fourth surface 4 of the body 110. Further, the second head portion 132a serves to physically and electrically connect the second internal electrodes 122 and the second external electrode 132 to each other.

The second band portion 132b extends from the second head portion 132a to portions of the first, second, fifth, and sixth surfaces 1, 2, 5, and 6 of the body 110 in order to improve a bonding strength, or the like.

In the present exemplary embodiment, the first and second external electrodes 131 and 132 are sintered electrodes containing one or more metal components selected from copper (Cu) and nickel (Ni).

Further, at least one plating layer may be additionally formed on a surface of each of the first and second external electrodes 131 and 132. Here, the plating layer may include a nickel (Ni) plating layer covering the surface of each of the first and second external electrodes 131 and 132 and a tin (Sn) plating layer covering the nickel plating layer.

Figure 4:
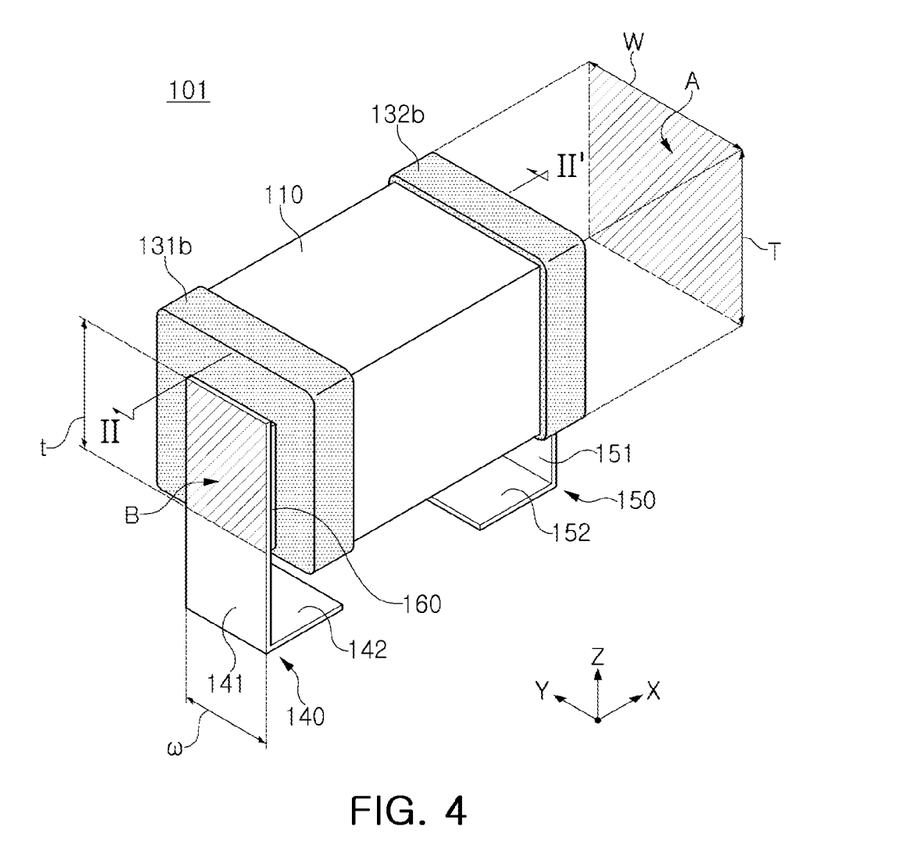
FIG. 4 is a perspective view schematically illustrating that a metal frame is bonded to the multilayer capacitor of FIG. 1.
Figure 5:
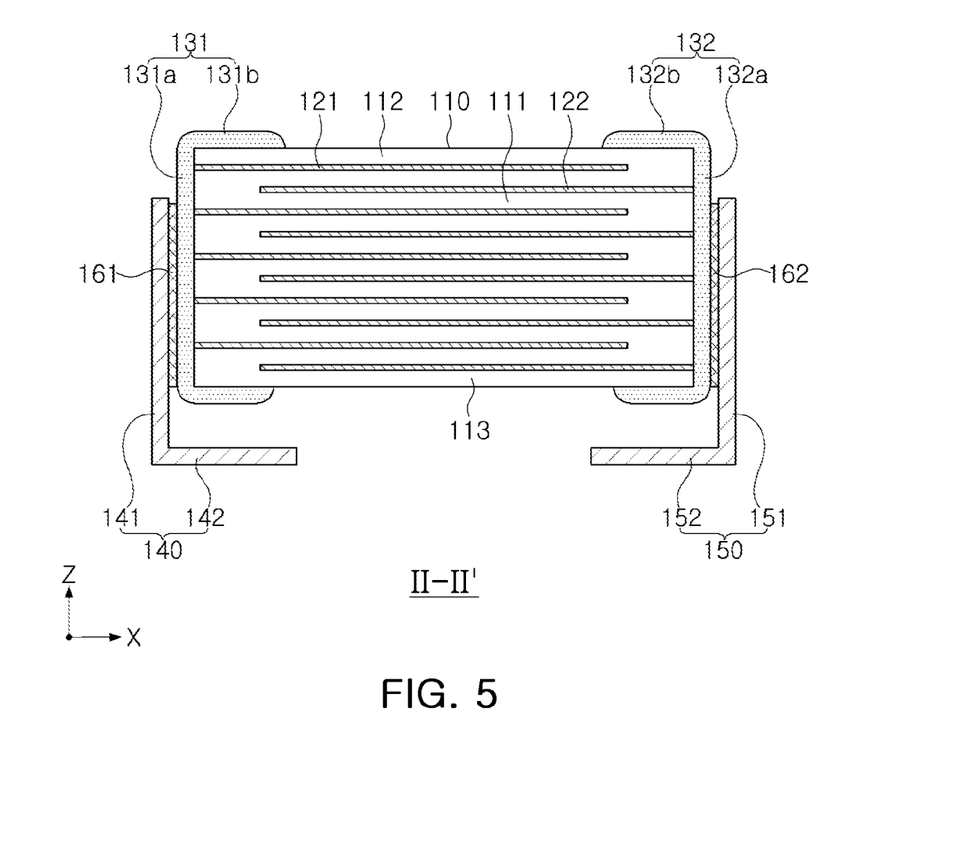
FIG. 5 is a cross-sectional view taken along line II-II' of FIG. 4.

FIG. 4 is a perspective view schematically illustrating that a metal frame is bonded to the multilayer capacitor of FIG. 1, and FIG. 5 is a cross-sectional view taken along line II-II' of FIG. 4.

Referring to FIGS. 4 and 5, an electronic component 101 according to the present exemplary embodiment includes the multilayer capacitor 100, and first and second metal frames 140 and 150 connected to the first and second external electrodes 131 and 132 of the multilayer capacitor 100, respectively.

The first metal frame 140 includes a first support portion 141 and a first mounted portion 142.

The first support portion 141 is formed so as to be perpendicular to a mounting surface, and is bonded to and electrically and physically connected to the first head portion 131a of the first external electrode 131. In an example, as illustrated in FIGS. 4 and 5, an upper portion of the first support portion 141 may have a region bonded to the first head portion 131a, and a lower portion of the first support portion 141 may have a portion extending toward the mounting surface in the thickness direction (Z direction). In one example, element A being perpendicular (or parallel) to element B may mean that element A is perfect perpendicular (or perfect parallel) to element B, or may mean that element A is substantially perpendicular (or substantially parallel) to element B in consideration of in consideration of an error, margin, or tolerance, which may occur in measurement or in manufacturing, appreciated by one of ordinary skill in the art. Here, element A or element B may refer to a structure, a plane, a surface, a line, a direction, or the like.

The first mounted portion 142 extends from a lower end of the first support portion 141 in the X direction, which is the first direction, is parallel to the mounting surface, and serves as a connection terminal at the time of mounting the electronic component on a board.

In an example, as illustrated in FIGS. 4 and 5, the first mounted portion 142 may extend toward the second head portion 132a of the second external electrode 132 in the first direction (X direction).

Further, the first mounted portion 142 may be disposed so as to be spaced apart from a lower surface of the multilayer capacitor 100 by a predetermined distance in the Z direction. That is, the first mounted portion 142 may be disposed so as to be spaced apart from the first surface 1 of the body 110 of the multilayer capacitor 100, and a lower surface of the first band portion 131b by predetermined distances in the Z direction.

The second metal frame 150 includes a second support portion 151 and a second mounted portion 152.

The second support portion 151 is formed so as to be perpendicular to the mounting surface, and is bonded to and electrically and physically connected to the second head portion 132a of the second external electrode 132 In an example, as illustrated in FIGS. 4 and 5, an upper portion of the second support portion 151 may have a region bonded to the second head portion 132a, and a lower portion of the second support portion 151 may have a portion extending toward the mounting surface in the thickness direction (Z direction).

The second mounted portion 152 extends from a lower end of the second support portion 151 in the X direction, which is the first direction, is parallel to the mounting surface, and serves as a connection terminal at the time of mounting the electronic component on a board.

In an example, as illustrated in FIGS. 4 and 5, the second mounted portion 152 may extend toward the first head portion 131a of the first external electrode 131 in the first direction (X direction).

Further, the second mounted portion 152 may be disposed so as to be spaced apart from the lower surface of the multilayer capacitor 100 by a predetermined distance in the Z direction. That is, the second mounted portion 152 may be disposed so as to be spaced apart from the first surface 1 of the body 110 of the multilayer capacitor 100, and a lower surface of the second band portion 132b by predetermined distances in the Z direction.

According to the present exemplary embodiment, an area of a region in which the first head portion 131a and the first support portion 141 are bonded to each other and an area of a region in which the second head portion 132a and the second support portion 151 are bonded to each other are smaller than areas of the first and second head portions 131a and 132a, respectively.

That is, according to the present disclosure, an area of a region in which the frame and the external electrode are bonded to each other is smaller as compared with that in the electronic component according to the related art, such that an adhesive force at a bonding interface is weakened as a temperature cycle is performed.

More specifically, in the electronic component 101 according to the present exemplary embodiment, $0.2A \leq B \leq 0.8A$, in which the area of each of the first and second head portions 131a and 132a is A, and the area of each of the region in which the first head portion 131a and the first support portion 141 are bonded to each other and the region in which the second head portion 132a and the second support portion 151 are bonded to each other is B.

Here, the region in which the first head portion 131a and the first support portion 141 are bonded to each other and the region in which the second head portion 132a and the second support portion 151 are bonded to each other may have various shapes such as a rectangular shape as illustrated in FIG. 4.

Hereinafter, an example in which all of the first and second head portions 131a and 132a, the region in which the first head portion 131a and the first support portion 141 are bonded to each other, and the region in which the second head portion 132a and the second support portion 151 are bonded to each other each have a rectangular shape will be described. However, all examples satisfying the expression $0.2A \leq B \leq 0.8A$ may be included in the present disclosure without limitation in shape.

Referring to FIG. 4, the second head portion 132a may have a rectangular shape of which a width is W and a thickness is T, and the first head portion 131a, which is symmetric to the second head portion 132a, may also have a rectangular shape of which a width is W and a thickness is T. In this case, A corresponding to the area of each of the first and second head portions 131a and 132a has a value of W*T.

In one example, the region in which the first head portion 131a and the first support portion 141 are bonded to each other may have a rectangular shape of which a width is co and a thickness is t, and the region in which the second head portion 132a and the second support portion 151 are bonded to each other, which is symmetric to the region in which the first head portion 131a and the first support portion 141 are bonded to each other, may also have a rectangular shape of which a width is co and a thickness is t. In this case, B corresponding to each of the region in which the first head portion 131a and the first support portion 141 are bonded to each other and the region in which the second head portion 132a and the second support portion 151 are bonded to each other has a value of ω*t.

In the electronic component 101 according to the present exemplary embodiment, 0.2A≤B≤0.8A. Therefore, in an example in which the bonding interface has a rectangular shape as illustrated in FIG. 4, 0.2W*T≤ω*t≤0.8W*T.

Further, the expression 0.2A≤B≤0.8A may be satisfied even in first to third modified examples in the present disclosure to be described with reference to FIGS. 6 through 8, similarly to the present exemplary embodiment. That is, in the first to third modified examples in the present disclosure, B corresponds to a value obtained by subtracting an area of an opening portion 145 of each example from the value of ω*t, and B calculated as described above satisfies the expression 0.2A≤B≤0.8A.

Meanwhile, the electronic component 101 is designed so that the area B (or ω*t) of each of the region in which the first head portion 131a and the first support portion 141 are bonded to each other, and the region in which the second head portion 132a and the second support portion 151 are bonded to each other satisfies the expression 0.2A≤B≤0.8A (or 0.2W*T≤ω*t≤0.8W*T). As a result, the bonding strength between the metal frame and the external electrode may maintain a predetermined value or more regardless of a temperature change applied to the electronic component 101.

Figure 9:
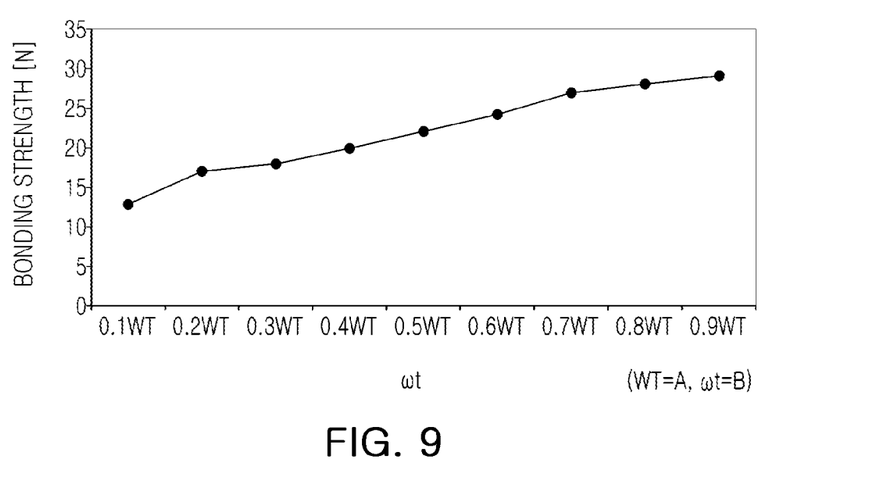
FIGS. 9 and 10 are graphs illustrating bonding strengths with respect to an area of a region in which a head portion of an external electrode and a support portion of the metal frame are bonded to each other in an electronic component before and after a temperature cycle is performed, respectively.
Figure 10:
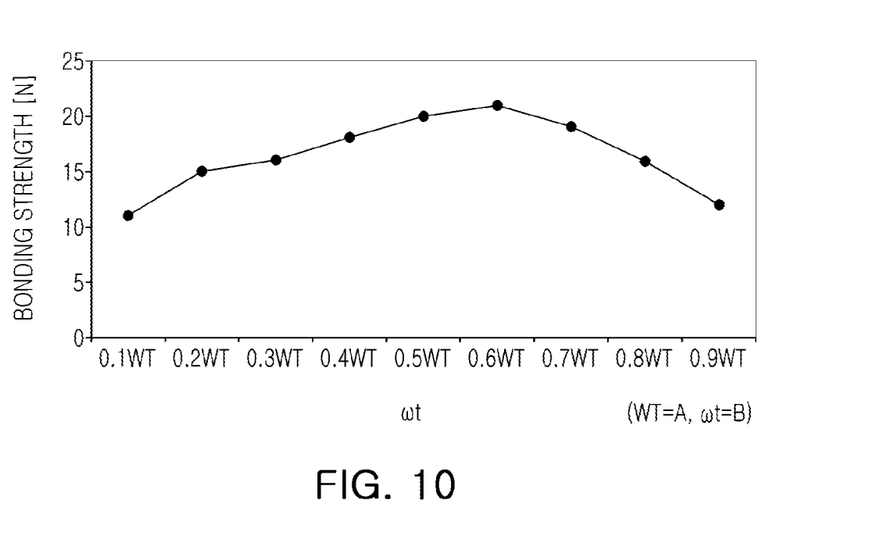

Here, specific data on a designed range of the area B is illustrated in FIGS. 9 and 10, and will be described with reference to FIG. 4.

FIGS. 9 and 10 are graphs illustrating bonding strengths with respect to the area of the region in which the head portion of the external electrode and the support portion of the metal frame are bonded to each other in the electronic component before and after the temperature cycle is performed, respectively.

First, FIG. 9 is a graph showing a bonding strength at the bonding interface between the external electrode and the metal frame before the temperature cycle is performed.

As illustrated in FIG. 9, before the temperature cycle is performed on the electronic component 101, as a ratio of the area (B or ω*t) of the region in which the external electrode and the metal frame are bonded to each other with respect to the area (A or W*T) of each of the first and second head portions 131a and 132a is increased, the bonding strength at the bonding interface is increased.

Here, according to ordinary knowledge in the technical field to which the present disclosure pertains, generally, the bonding strength at the bonding interface between the external electrode and the metal frame is required to be 15N or more. Therefore, referring to FIG. 9, when the area (B or ω*t) of the bonding region satisfies the expression B≥0.2A (or ω*t≥0.2W*T), the bonding strength at the bonding interface between the external electrode and the metal frame may be 15N or more, thereby maintaining the durability of the electronic component 101 without being affected by vibration or external deformation.

FIG. 10 is a graph illustrating a result obtained by performing the temperature cycle in a range of −55° C. to 125° C. 1000 times. The change of the bonding strength at the bonding interface between the external electrode and the metal frame after the temperature change is repeatedly applied is compared with the change of the bonding strength shown in the graph of FIG. 9.

Referring to FIG. 10, it may be appreciated that the bonding strength in each experimental example is lower than that in FIG. 9, when the temperature cycle is performed on the electronic component 101. In the process of performing the temperature cycle, the external electrode and the metal frame repeatedly contract and expand, and it may be interpreted that such a decrease results from a difference in coefficient of thermal expansion (CTE) (coefficient of linear expansion) caused by a difference in component between the external electrode and the metal frame.

For example, a main component of the first and second external electrodes 131 and 132 may be copper (Cu), and the CTE of copper (Cu) is $16.5 \times 10^{-6}/°$ C. For example, a main component of the first and second metal frames 140 and 150 may be iron (Fe), and the CTE of iron (Fe) is $12.3 \times 10^{-6}/°$ C. That is, the CTE of the first and second external electrodes 131 and 132 is larger than the CTE of the first and second metal frames 140 and 150.

In this case, since the degree of contraction and expansion of the first and second external electrodes 131 and 132 is relatively high, and the degree of contraction and expansion of the first and second metal frames 140 and 150 is relatively low, the adhesive force (that is, the bonding strength) at the bonding interface between the external electrode and the metal frame may be gradually weakened due to the repetitive temperature change.

As illustrated in FIG. 10, as the ratio of the area (B or ω*t) of the region in which the external electrode and the metal frame are bonded to each other with respect to the area (A or W*T) of each of the first and second head portions 131a and 132a is increased, the bonding strength at the bonding interface is gradually increased and then decreased. That is, it may be appreciated that, after the temperature cycle is performed, the bonding strength is rather decreased in a case in which the proportion of the area of the region in which the external electrode and the metal frame are bonded to each other is equal to or higher than a predetermined level, unlike FIG. 9.

It may be interpreted that such a result is caused because the difference in degree of contraction and expansion between external electrode and the metal frame is increased as the area (B or ω*t) of the region in which the external electrode and the metal frame are bonded to each other is increased.

However, the bonding strength at the bonding interface between the external electrode and the metal frame is required to be 15N or more, similarly to FIG. 9, even when the temperature cycle is performed.

Therefore, referring to FIG. 10, when the area (B or ω*t) of the bonding region satisfies the expression B≤0.8A (or ω*t≤0.8W*T), the bonding strength at the bonding interface between the external electrode and the metal frame may be 15N or more, thereby maintaining the durability of the electronic component 101 without being affected by vibration or external deformation, and the repetitive temperature change.

In addition, according to the results shown in FIGS. 9 and 10, when electronic component 101 according to an exemplary embodiment in the present disclosure satisfies the expression 0.2A≤B≤0.8A, the bonding strength of 15N or more may be maintained at the bonding interface between the external electrode and the metal frame, thereby effectively suppressing a defect such as delamination or a crack from occurring.

Referring back to FIGS. 4 and 5, the electronic component may further include conductive bonding layers disposed between the first external electrode 131 and the first support portion 141 and between the second external electrode 132 and the second support portion 151, respectively. Here, the conductive bonding layers may include a first conductive bonding layer 161 disposed between the first head portion 131a and the first support portion 141, and a second conductive bonding layer 162 disposed between the second head portion 132a and the second support portion 151.

A main component of the first conductive bonding layer 161 may be a metal component that is the same as that of the first head portion 131a of the first external electrode 131.

Further, a main component of the second conductive bonding layer 162 may be a metal component that is the same as that of the second head portion 132a of the second external electrode 132.

Figure 6:
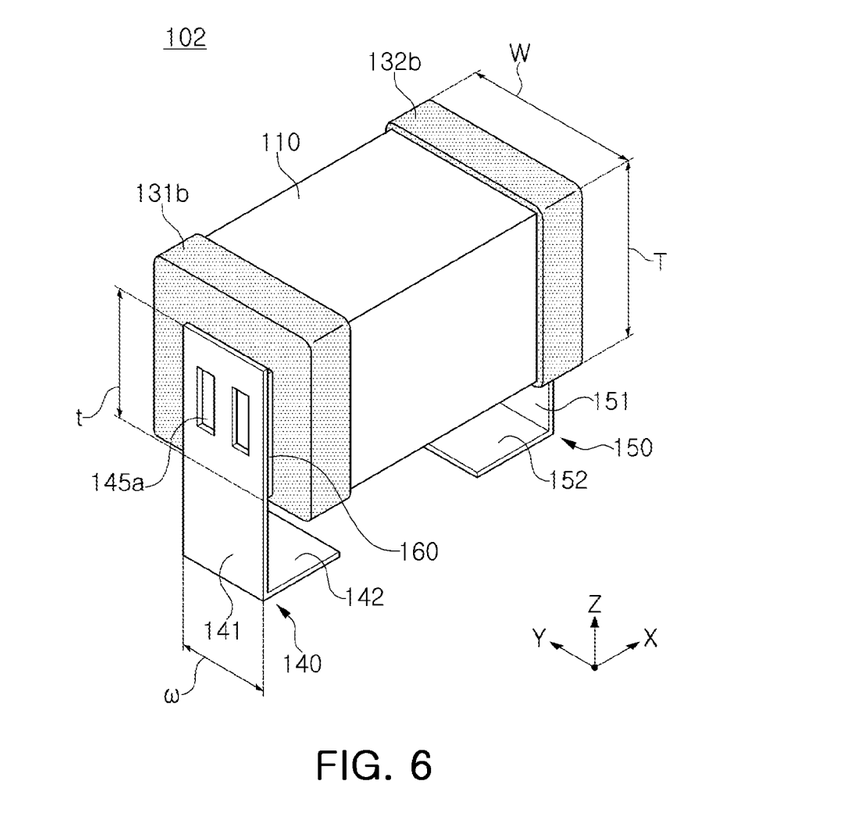
FIG. 6 is a perspective view schematically illustrating an electronic component according to a first modified example in the present disclosure.
Figure 7:
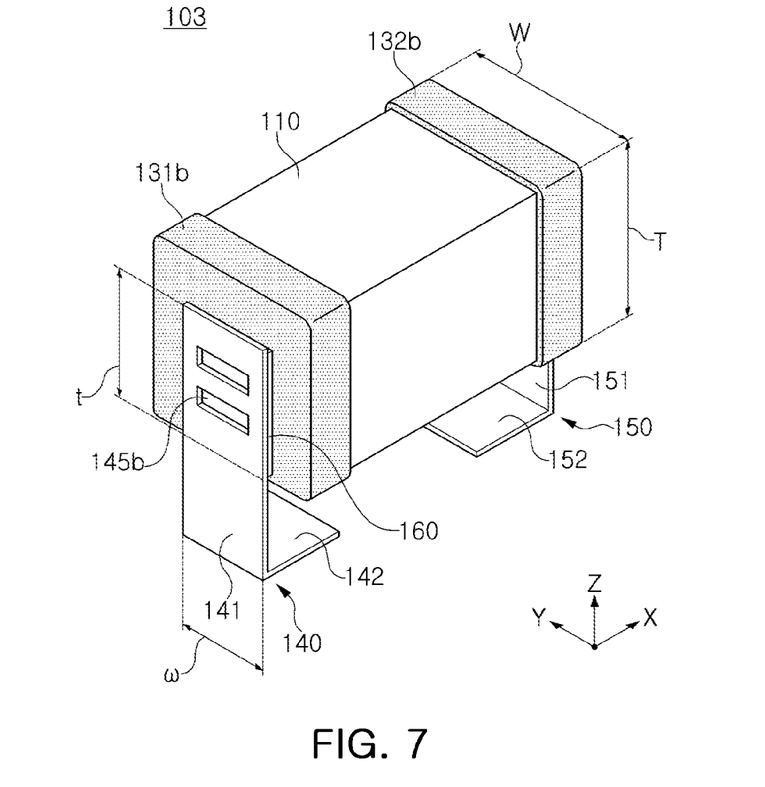
FIG. 7 is a perspective view schematically illustrating an electronic component according to a second modified example in the present disclosure.
Figure 8:
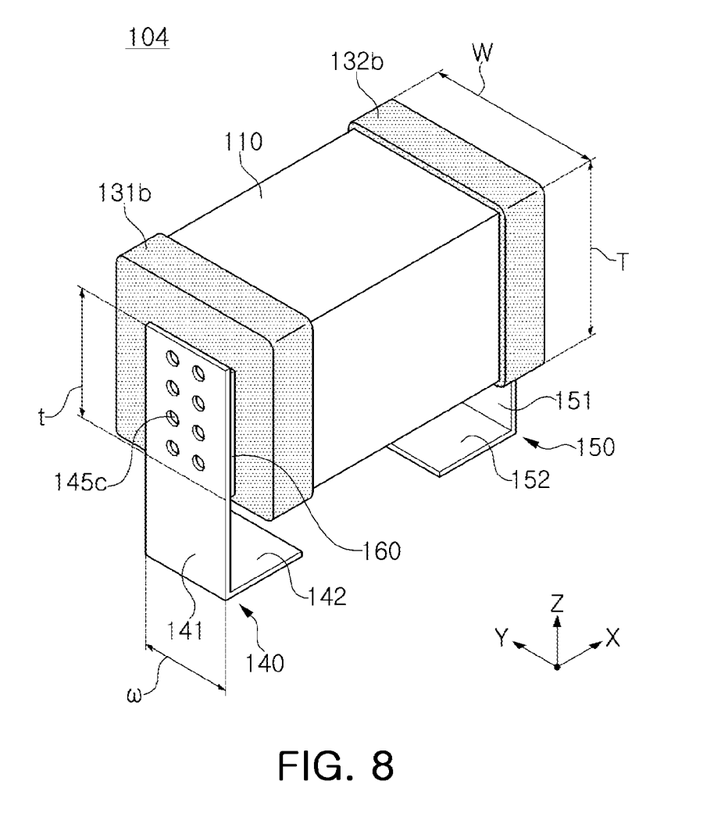
FIG. 8 is a perspective view schematically illustrating an electronic component according to a third modified example in the present disclosure.

FIGS. 6 through 8 illustrate partially modified examples of the exemplary embodiment in the present disclosure illustrated in FIG. 4. Specifically, first and second support portions 141 and 151 of electronic components 102, 103, and 104 illustrated in FIGS. 6 through 8, respectively, may further include the opening portions 145a, 146b, or 146c formed in at least apart of regions bonded to first and second head portions 131a and 132a, respectively. In addition, the electronic components 102, 103, and 104 according to the modified examples in the present disclosure may also be designed to satisfy the expression 0.2A≤B≤0.8A.

First, FIG. 6 is a perspective view schematically illustrating the electronic component according to the first modified example in the present disclosure.

As illustrated in FIG. 6, the first and second support portions 141 and 151 of the electronic component 102 according to the first modified example of the present disclosure may further include a plurality of openings 145a arranged in the width direction in at least apart of regions bonded to the first and second head portions 131a and 132a, respectively. The plurality of openings 145a may be disposed in the region in which the first head portion 131a and the first support portion 141 are bonded to each other and the region in which the second head portion 132a and the second support portion 151 are bonded to each other.

Here, the electronic component 102 according to the first modified example in the present disclosure may be designed to satisfy the expression 0.2A≤B≤0.8A. In calculating an area B of each of the region in which the first head portion 131a and the first support portion 141 are bonded to each other and the region in which the second head portion 132a and the second support portion 151 are bonded to each other, a total area of the plurality of openings 145a needs to be subtracted from the value of ω*t.

As described above, as the electronic component 102 according to the first modified example in the present disclosure is designed so that the area of the region in which the external electrode and the metal frame are bonded to each other is within a predetermined range, the bonding strength of 15N or more may be maintained at the bonding interface, thereby effectively suppressing a defect such as delamination or a crack from occurring.

FIG. 7 is a perspective view schematically illustrating the electronic component according to the second modified example in the present disclosure.

As illustrated in FIG. 7, the first and second support portions 141 and 151 of the electronic component 103 according to the second modified example of the present disclosure may further include a plurality of openings 145b arranged in a vertical direction in at least a part of regions bonded to the first and second head portions 131a and 132a, respectively. The plurality of openings 145b may be disposed in the region in which the first head portion 131a and the first support portion 141 are bonded to each other and the region in which the second head portion 132a and the second support portion 151 are bonded to each other.

Here, the electronic component 103 according to the second modified example in the present disclosure may be designed to satisfy the expression 0.2A≤B≤0.8A. In calculating an area B of each of the region in which the first head portion 131a and the first support portion 141 are bonded to each other and the region in which the second head portion 132a and the second support portion 151 are bonded to each other, a total area of the plurality of openings 145b needs to be subtracted from the value of ω*t.

As described above, as the electronic component 103 according to the second modified example in the present disclosure is designed so that the area of the region in which the external electrode and the metal frame are bonded to each other is within a predetermined range, the bonding strength of 15N or more may be maintained at the bonding interface, thereby effectively suppressing a defect such as delamination or a crack from occurring.

FIG. 8 is a perspective view schematically illustrating the electronic component according to the third modified example in the present disclosure.

As illustrated in FIG. 8, the first and second support portions 141 and 151 of the electronic component 104 according to the second modified example of the present disclosure may further include a plurality of openings 145c arranged in rows and columns or arranged irregularly in at least a part of regions bonded to the first and second head portions 131a and 132a, respectively. The plurality of openings 145c may be disposed in the region in which the first head portion 131a and the first support portion 141 are bonded to each other and the region in which the second head portion 132a and the second support portion 151 are bonded to each other.

Here, the electronic component 104 according to the third modified example in the present disclosure may be designed to satisfy the expression 0.2A≤B≤0.8A. In calculating an area B of each of the region in which the first head portion 131a and the first support portion 141 are bonded to each other and the region in which the second head portion 132a and the second support portion 151 are bonded to each other, a total area of the plurality of openings 145c needs to be subtracted from the value of ω*t.

As described above, as the electronic component 104 according to the third modified example in the present disclosure is designed so that the area of the region in which the external electrode and the metal frame are bonded to each other is within a predetermined range, the bonding strength of 15N or more may be maintained at the bonding interface, thereby effectively suppressing a defect such as delamination or a crack from occurring.

As set forth above, according to the exemplary embodiments in the present disclosure, even when a temperature change is repeatedly applied to the electronic component using the metal frame, a bonding strength at the bonding interface between the external electrode and the metal frame may be prevented from being weakened, thereby suppressing a defect such as delamination or a crack from occurring.

While exemplary embodiments have been shown and described above, it will be apparent to those skilled in the art that modifications and variations could be made without departing from the scope of the present disclosure as defined by the appended claims.

What is claimed is:

1. An electronic component comprising:
a body;
first and second external electrodes including first and second head portions disposed on opposite end surfaces of the body in a first direction, respectively; and
first and second metal frames, the first metal frame including a first support portion bonded to the first head portion, and a first mounted portion extending from a lower end of the first support portion in the first direction, and the second metal frame including a second support portion bonded to the second head portion, and a second mounted portion extending from a lower end of the second support portion in the first direction,
wherein $0.2A \leq B \leq 0.8A$ in which an area of each of the first and second head portions is A, and an area of each of a region in which the first head portion and the first support portion are bonded to each other, and a region in which the second head portion and the second support portion are bonded to each other is B,
in a view in the first direction, one or more outer edges of the first support portion are within the first head portion, and one or more outer edges of the second support portion are within the second head portion,
the first and second support portions include opening portions disposed in at least a part of regions bonded to the first and second head portions, respectively,
the opening portions are disposed in the region in which the first head portion and the first support portion are bonded to each other and the region in which the second head portion and the second support portion are bonded to each other, respectively, and each include a plurality of openings,
a main component of the first and second metal frames contains iron, and
a coefficient of thermal expansion (CTE) of the first and second metal frames is $12.3 \times 10^{-6}/°$ C. or less.

2. The electronic component of claim 1, wherein a coefficient of thermal expansion (CTE) of the first and second external electrodes is larger than the CTE of the first and second metal frames.

3. The electronic component of claim 1, wherein the body includes:
dielectric layers; and
first and second internal electrodes alternately disposed with one of the dielectric layers interposed therebetween and having one ends connected to the first and second external electrodes, respectively.

4. The electronic component of claim 1, wherein the first and second external electrodes further include a first band portion extending from the first head portion to portions of upper and lower surfaces of the body, and a second band portion extending from the second head portion to portions of the upper and lower surfaces of the body, respectively, and
the first and second mounted portions are spaced apart from the first and second band portions, respectively.

5. The electronic component of claim 1, wherein the plurality of openings are arranged in a width direction.

6. The electronic component of claim 1, wherein the plurality of openings are arranged in a vertical direction.

7. The electronic component of claim 1, wherein each of the region in which the first head portion and the first support portion are bonded to each other, and the region in which the second head portion and the second support portion are bonded to each other has a rectangular shape.

8. The electronic component of claim 1, wherein the first mounted portion extends from the lower end of the first support portion toward the second head portion, and the second mounted portion extends from the lower end of the second support portion toward the first head portion.

9. The electronic component of claim 1, further comprising:
a first conductive bonding layer disposed between the first external electrode and the first support portion; and
a second conductive bonding layer disposed between the second external electrode and the second support portion.

10. The electronic component of claim 9, wherein the first and second conductive bonding layers are disposed in the region in which the first head portion and the first support portion are bonded to each other, and the region in which the second head portion and the second support portion are bonded to each other, respectively.

11. An electronic component comprising:
a body;
first and second external electrodes including first and second head portions disposed on opposite end surfaces of the body in a first direction, respectively; and
first and second metal frames, the first metal frame including a first support portion bonded to the first head portion, and a first mounted portion bent from the first support portion, and the second metal frame including a second support portion bonded to the second head portion, and a second mounted portion bent from the second support portion,
wherein $0.2A \leq B \leq 0.8A$, in which A is an area of the first head portion and B is an area of a region in which the first head portion and the first support portion are bonded to each other,
the first head portion includes first and second edges opposing each other in a second direction and third and fourth edges opposing each other in a third direction, and
in a view in the first direction, the first metal frame is spaced apart from each of the first, second, and third edges and crosses the fourth edge.

12. The electronic component of claim 11, wherein a coefficient of thermal expansion (CTE) of the first external electrode is larger than a CTE of the first metal frame.

13. The electronic component of claim 11, wherein the body includes:
dielectric layers; and
first and second internal electrodes alternately disposed with one of the dielectric layers interposed therebetween and having one ends connected to the first and second external electrodes, respectively.

14. The electronic component of claim 11, wherein the first and second external electrodes further include a first band portion extending from the first head portion to portions of upper and lower surfaces of the body, and a second band portion extending from the second head portion to portions of the upper and lower surfaces of the body, respectively, and the first and second mounted portions are spaced apart from the first and second band portions, respectively.

15. The electronic component of claim 11, wherein the first and second support portions include opening portions, respectively.

16. The electronic component of claim 11, wherein the region in which the first head portion and the first support portion are bonded to each other has a rectangular shape.

17. The electronic component of claim 11, wherein the first mounted portion extends from the first support portion toward the second mounted portion, and the second mounted portion extends from the second support portion toward the first mounted portion.

18. The electronic component of claim 11, further comprising:
   a first conductive bonding layer disposed between the first head portion and the first support portion; and
   a second conductive bonding layer disposed between the second head portion and the second support portion.

* * * * *